US011998494B2

(12) United States Patent
Basu et al.

(10) Patent No.: US 11,998,494 B2
(45) Date of Patent: Jun. 4, 2024

(54) PERCEPTION SUPPORTING HARDWARE FEATURES FOR A WHEELCHAIR ACCESSIBLE AUTONOMOUS VEHICLE

(71) Applicant: GM Cruise Holdings LLC, San Francisco, CA (US)

(72) Inventors: Rajat Basu, San Francisco, CA (US); Jessica Uelmen, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/988,709

(22) Filed: Nov. 16, 2022

(65) Prior Publication Data

US 2023/0084082 A1 Mar. 16, 2023

Related U.S. Application Data

(63) Continuation of application No. 16/887,837, filed on May 29, 2020.

(51) Int. Cl.
*A61G 3/08* (2006.01)
*A61G 3/06* (2006.01)
*B60P 1/43* (2006.01)
*G05D 1/00* (2006.01)
*G06V 20/56* (2022.01)

(52) U.S. Cl.
CPC ........... *A61G 3/0808* (2013.01); *A61G 3/061* (2013.01); *B60P 1/43* (2013.01); *G05D 1/0088* (2013.01); *G06V 20/56* (2022.01); *A61G 2203/36* (2013.01)

(58) Field of Classification Search
CPC ................................................... A61G 3/0808
See application file for complete search history.

(56) References Cited

U.S. PATENT DOCUMENTS

| 10,624,802 | B2 | 4/2020 | Lacaze et al. |
| 11,523,950 | B2* | 12/2022 | Basu ............... G06V 20/56 |
| 11,560,150 | B2* | 1/2023 | Ohno ............... B60W 50/12 |
| 11,597,405 | B2* | 3/2023 | Uelmen ............ A61G 3/061 |
| 11,628,801 | B2* | 4/2023 | Sekizuka ........ B60R 21/01544 |
| | | | 410/3 |
| 2020/0410408 | A1 | 12/2020 | Shitara et al. |
| 2021/0191396 | A1 | 6/2021 | Kan et al. |
| 2021/0245650 | A1 | 8/2021 | Tomioka et al. |
| 2021/0369516 | A1 | 12/2021 | Basu et al. |
| 2021/0370976 | A1 | 12/2021 | Uelmen et al. |
| 2023/0084082 | A1* | 3/2023 | Basu ............... G05D 1/0088 |

OTHER PUBLICATIONS

United States Patent and Trademark Office, U.S. Appl. No. 16/887,837, Office Action dated Apr. 29, 2022, 8 pages.

* cited by examiner

*Primary Examiner* — Michael A Berns
(74) *Attorney, Agent, or Firm* — Michael DiCato (57) ABSTRACT

The subject disclosure relates to features for improving wheelchair accessibility in autonomous vehicles (AVs) and in particular, for enabling automatic ingress/egress of a wheelchair ramp to facilitate the loading and unloading of a passenger wheelchair. In some aspects, a process of the disclosed technology includes steps for identifying one or more visual reference features on at least one surface of an autonomous vehicle (AV), automatically deploying a ramp to facilitate ingress of a wheelchair, and tracking ingress of the wheelchair based on the one or more visual reference features. Systems and machine-readable media are also provided.

20 Claims, 10 Drawing Sheets

PERCEPTION SUPPORTING HARDWARE FEATURES FOR A WHEELCHAIR ACCESSIBLE AUTONOMOUS VEHICLE

CROSS-REFERENCE TO RELATED APPLICATIONS

This application is a continuation and claims the benefit of U.S. application Ser. No. 16/887,837, filed on May 29, 2020, entitled "PERCEPTION SUPPORTING HARDWARE FEATURES FOR A WHEELCHAIR ACCESSIBLE AUTONOMOUS VEHICLE," the contents of which is expressly incorporated by reference herein in its entirety for all purposes.

BACKGROUND

1. Technical Field

The subject technology provides solutions for improving wheelchair accessibility in autonomous vehicles (AVs) and in particular, for enabling automatic ingress/egress of a wheelchair ramp to facilitate the loading and unloading of a passenger wheelchair.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

In conventional ridesharing arrangements, human drivers assist passengers with accessibility into an out of the vehicle. For example, human drivers routinely help passengers load/unload and secure accessibility equipment, such as a wheelchairs and other mobility devices. Because human drivers are absent from autonomous vehicle (AV) deployments, there exists a need to provide automated support for the ingress/egress for passengers with special accessibility needs.

Aspects of the disclosed technology address the foregoing limitations by providing perception supporting hardware features that facilitate the loading and unloading (ingress/egress) of mobility devices, such as wheelchairs and/or personal scooters. In some aspects, the disclosed technology includes AV sensors, e.g. cameras and/or Light Detection and Ranging (LiDAR) sensors that are configured to provide perception capabilities to the computing systems of the wheelchair accessible vehicle (WAV). In some approaches, an AV of the disclosed technology can include reference markers that are disposed on or around certain AV features, such as on a wheelchair ramp, to facilitate AV perception of the accessibility equipment loading/unloading process. Additionally, as discussed in further detail below, a restraint system of the AV can be configured to automatically secure one or more pieces of equipment, such as a wheelchair, before a ride is commenced.

Figure 1:
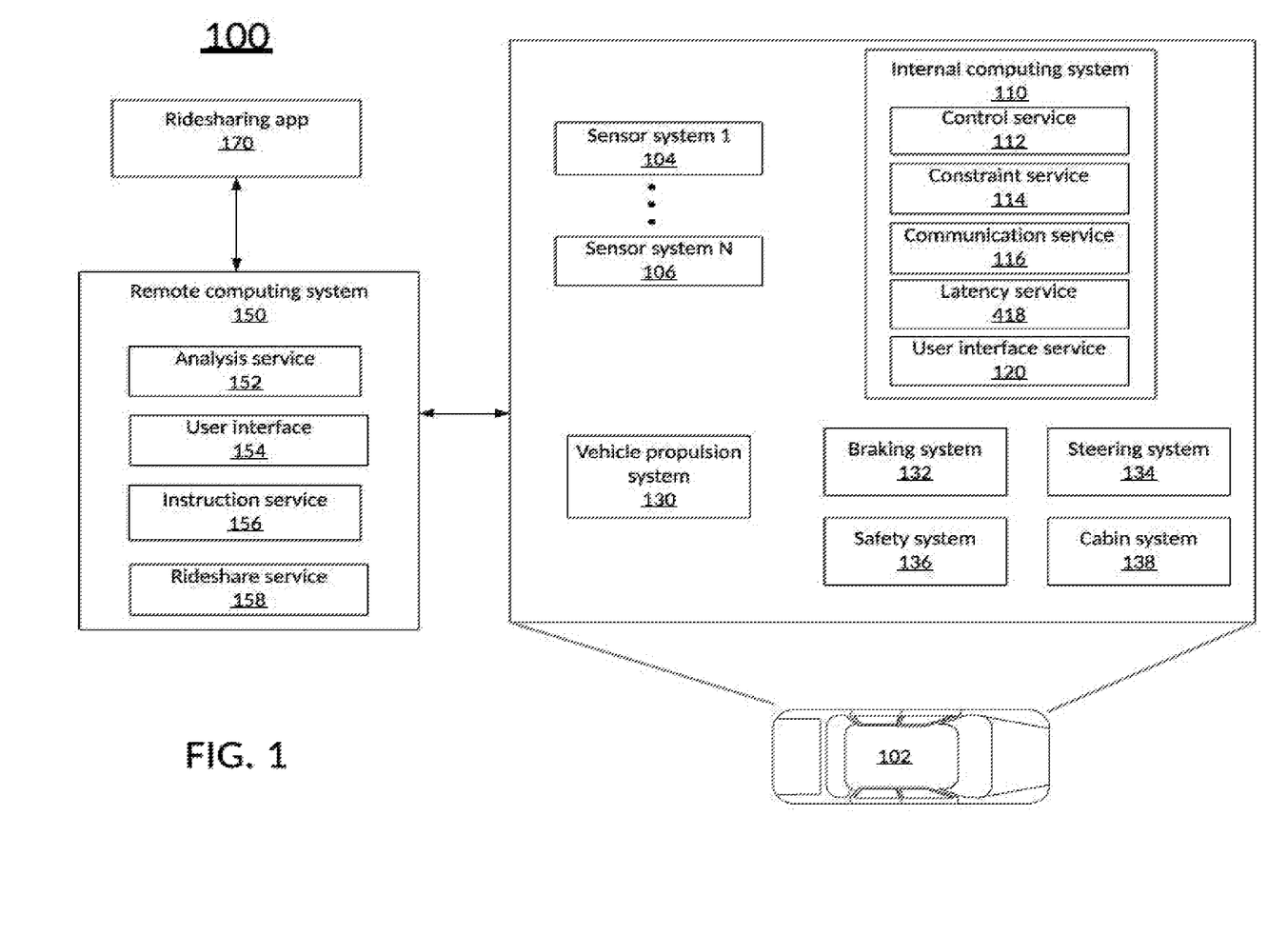
FIG. 1 illustrates an example system environment that can be used to facilitate AV navigation and routing operations, according to some aspects of the disclosed technology.

The disclosure now turns to FIG. 1, which illustrates an example system environment 100 that can be used to facilitate AV dispatch and operations, according to some aspects of the disclosed technology. Autonomous vehicle 102 can navigate about roadways without a human driver based upon sensor signals output by sensor systems 104-106 of autonomous vehicle 102. Autonomous vehicle 102 includes a plurality of sensor systems 104-106 (a first sensor system 104 through an Nth sensor system 106). Sensor systems 104-106 are of different types and are arranged about the autonomous vehicle 102. For example, first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation. Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 180 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 180 as well communicates with other services of internal computing system 110 to effectuate operation of autonomous vehicle 102. In some embodiments, control service 112 may carry out operations in concert one or more other systems of autonomous vehicle 102. Internal computing system 110 can also include constraint service 114 to facilitate safe propulsion of autonomous vehicle 102. Constraint service 116 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides personal cellular (long-term evolution (LTE), 3G, 4G, 5G, etc.) communication.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102. Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102. Remote computing system 150 can also include rideshare service 158 configured to interact with ridesharing applications 170 operating on (potential) passenger computing devices. Rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc. Remote computing system 150 can, in some cases, include at least one computing system 150 as illustrated in or discussed with respect to FIG. 7, or may include at least a subset of the components illustrated in FIG. 7 or discussed with respect to computing system 150.

Figure 2:
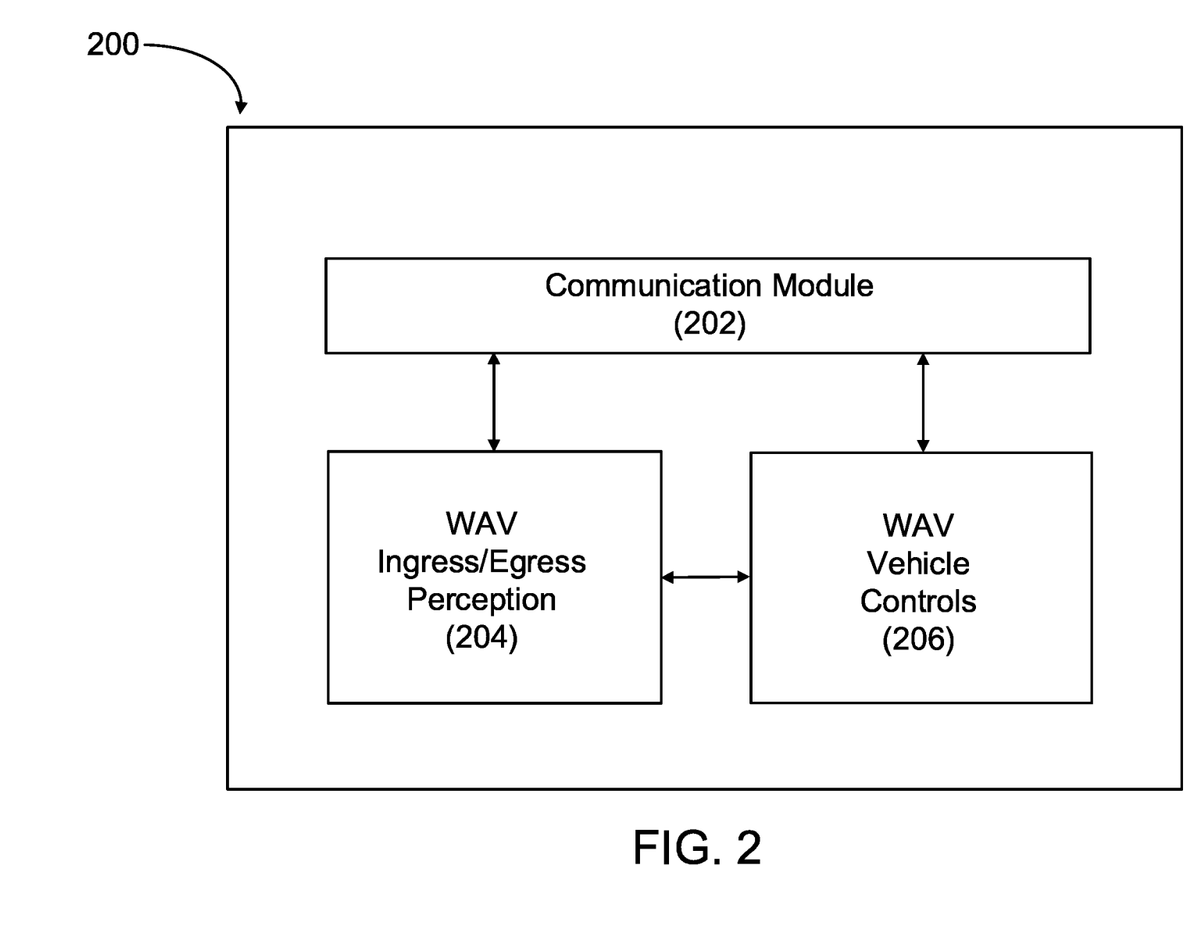
FIG. 2 illustrates an example accessibility system that facilitates AV ingress/egress of a wheelchair, according to some aspects of the disclosed technology.

FIG. 2 illustrates an example accessibility system 200 that facilitates AV ingress/egress of a wheelchair, according to some aspects of the disclosed technology. Accessibility system 200 includes communication module 202 that is communicatively coupled to ingress/egress perception module 204, and vehicle control module 206.

Communication module 202 can be responsible for receiving commands related to the operation of accessibility controls, such as to facilitate ingress/egress of a wheelchair ramp and/or enlist operations of an accompanying restraint system. By way of example, communications module 202 can be configured for communication with a mobile device and associated applications that can receive requests from a user/rider, and provide notifications to the rider. As such, communications module 202 can facilitate accessibility operations between wheelchair accessible AV, and various users/riders.

In turn, WAV ingress/egress perception module 204 can provide perception needed to track progress of the ingress/egress of accessibility equipment, such as by tracking progress in loading or unloading a wheelchair from an AV, for example, using a wheelchair ramp. As discussed in further detail below, perception functionalities performed by WAV ingress/egress perception module 204 can be facilitated by one or more visual cues/markers that are disposed at locations in the AV.

In conjunction with WAV vehicle controls module 206, WAV ingress/egress perception module 204 can provide functionality needed to automate the assistance process, for example by deploying a wheelchair ramp, tracking the progress of the conveyance of accessibility equipment into the AV, and securing the accessibility equipment using an automated restraint system (not shown).

Figure 3:
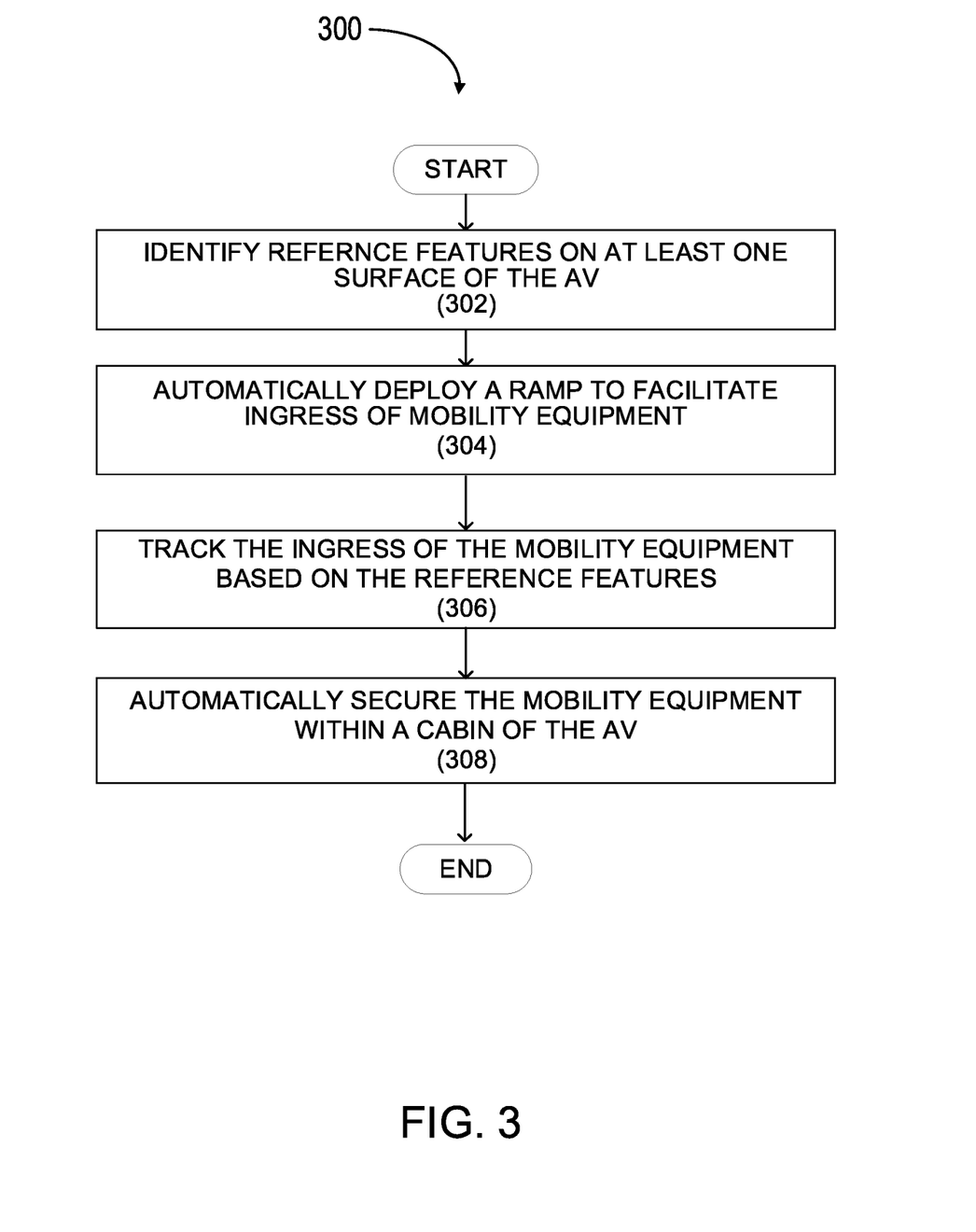
FIG. 3 illustrates an example of an automated wheelchair ingress/egress process, according to some aspects of the disclosed technology.

FIG. 3 illustrates an example of an automated wheelchair ingress/egress process 300, according to some aspects of the disclosed technology. Process 300 begins with step 302 in which one or more visual reference features (e.g., one or more reflective markers) are identified (e.g. by a perception system of the AV) on at least one surface of the AV. In some approaches, multiple reference features of known locations can be used to ascertain the location of equipment within the AV, such as the deployment and retraction of a wheelchair ramp, as well as to track position/location information for one or more pieces of accessibility equipment and/or people boarding or exiting the AV cabin.

By way of example, location information may be ascertained about the wheelchair ramp position and/or a loading status of a wheelchair being loaded or unloaded from the AV based on visual obstructions between one or more of the reference features and one or more AV sensors (e.g. cameras and/or LiDAR sensors, etc.). Although visual markers can be used in some embodiments, it is understood that the perception system of the disclosed technology can be configured to perform tracking and location determinations using only AV sensors (e.g., cameras and/or LiDAR sensors, etc.).

In step 304, a ramp of the AV is automatically deployed to facilitate the ingress of one or more items of mobility equipment (e.g., a wheelchair). It is understood that other aspects of the AV operation can also be automatically controlled, such as the opening and closing of one or more doors of the AV and/or the automatic harness/release of a restraint system, as discussed in further detail below.

In step 306, ingress of the mobility equipment (wheelchair) is tracked using the reference features. By way of example, visual obstruction of one or more reference features disposed on the wheelchair ramp may indicate a position of the wheelchair on the ramp. Tracking can also continue using one or more visual features that are disposed inside the AV cabin.

In step 308, the mobility equipment can be automatically secured within a cabin of the AV. Similar to step 306, the maneuver and automatic restraint of mobility equipment can be aided using location/position perception that is performed using one or more visual features. However, location/position tracking without the use of visual markers is contemplated. For example, tracking necessary to perform ingress/egress operations may be performed using AV sensor data that is provided to a machine-learning model.

Figure 4A:
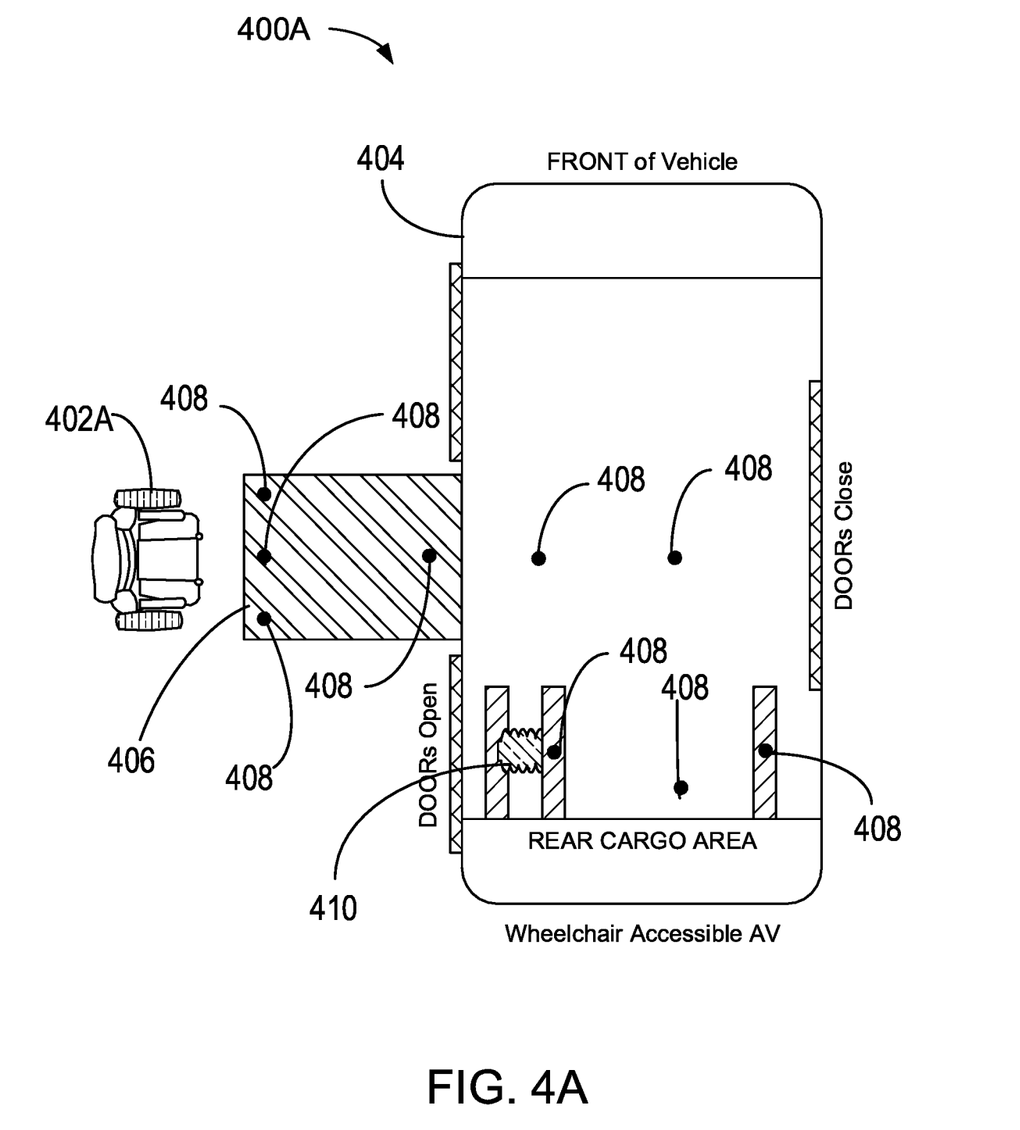
FIGS. 4A and 4B illustrate an example of a wheelchair ingress into an AV, according to some aspects of the disclosed technology.
Figure 4B:
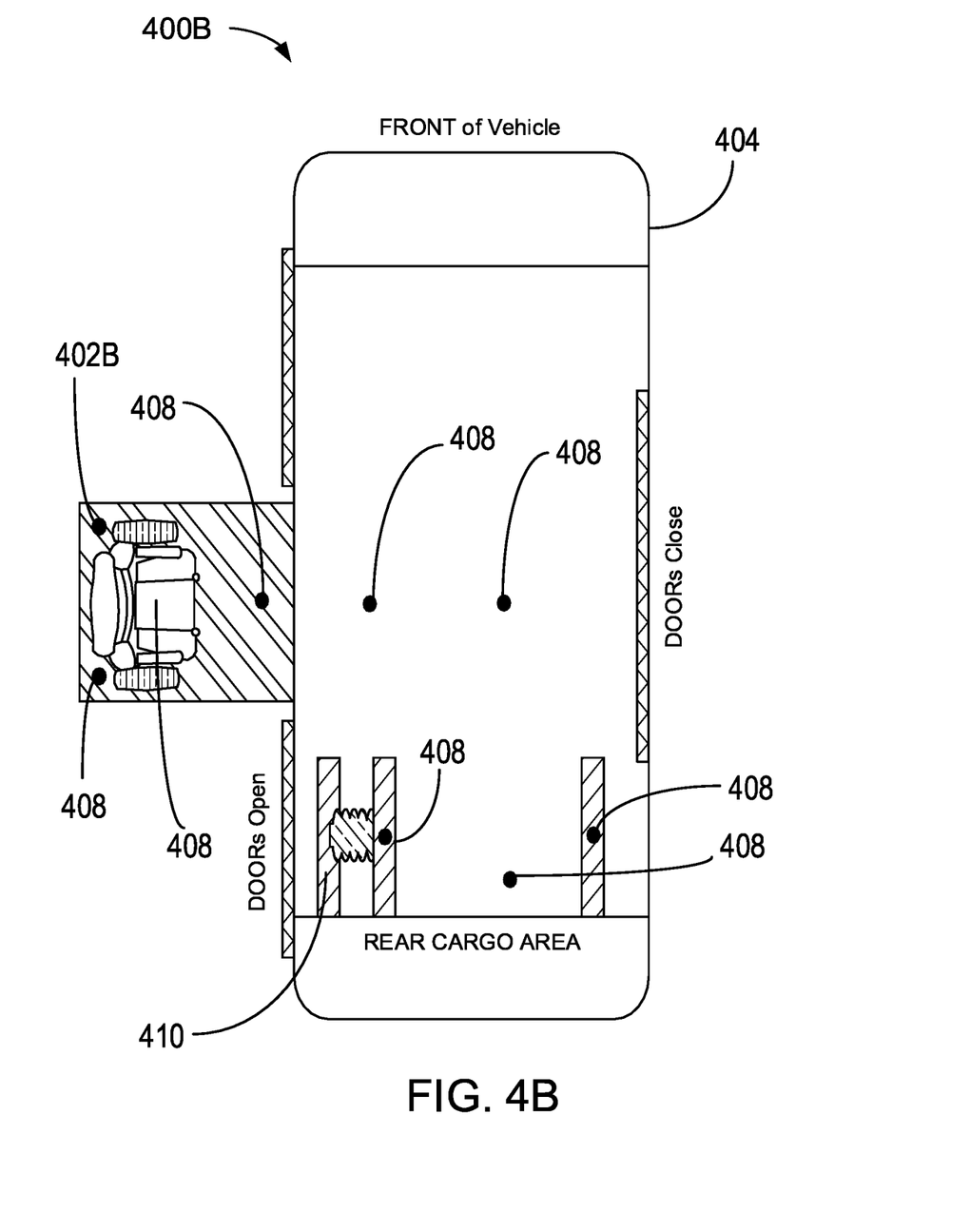

FIGS. 4A and 4B illustrate examples of a wheelchair ingress into an AV 400, according to some aspects of the disclosed technology. In particular, FIG. 4A illustrates an AV 400A in which a wheelchair 402A is being readied for loading into a cabin 404 of AV 400A, e.g., via ramp 406. In this example, visual markers 408 (reflective markers) are disposed at various locations on a surface of ramp 406, and on various surface locations within cabin 404 of AV 400. Although visual markers 408 are used in the illustrated examples, it is understood that the visual markers may include any visual patterns, for example, that are integrated as features of the AV's design.

In the example of FIG. 4B, wheelchair 402B has been moved onto ramp 406. In this position, wheelchair 402B visually obfuscates some of the visual markers disposed on ramp 406. In this manner, a position of wheelchair 402B can be ascertained, e.g., by a perception system of the AV, for example, that includes one or more cameras or other optical sensors capable of detecting the visual markers. In some aspects, the placement and pattern of visual markers can be designed to facilitate determinations of wheelchair 402B and/or ramp 406 position.

Figure 5A:
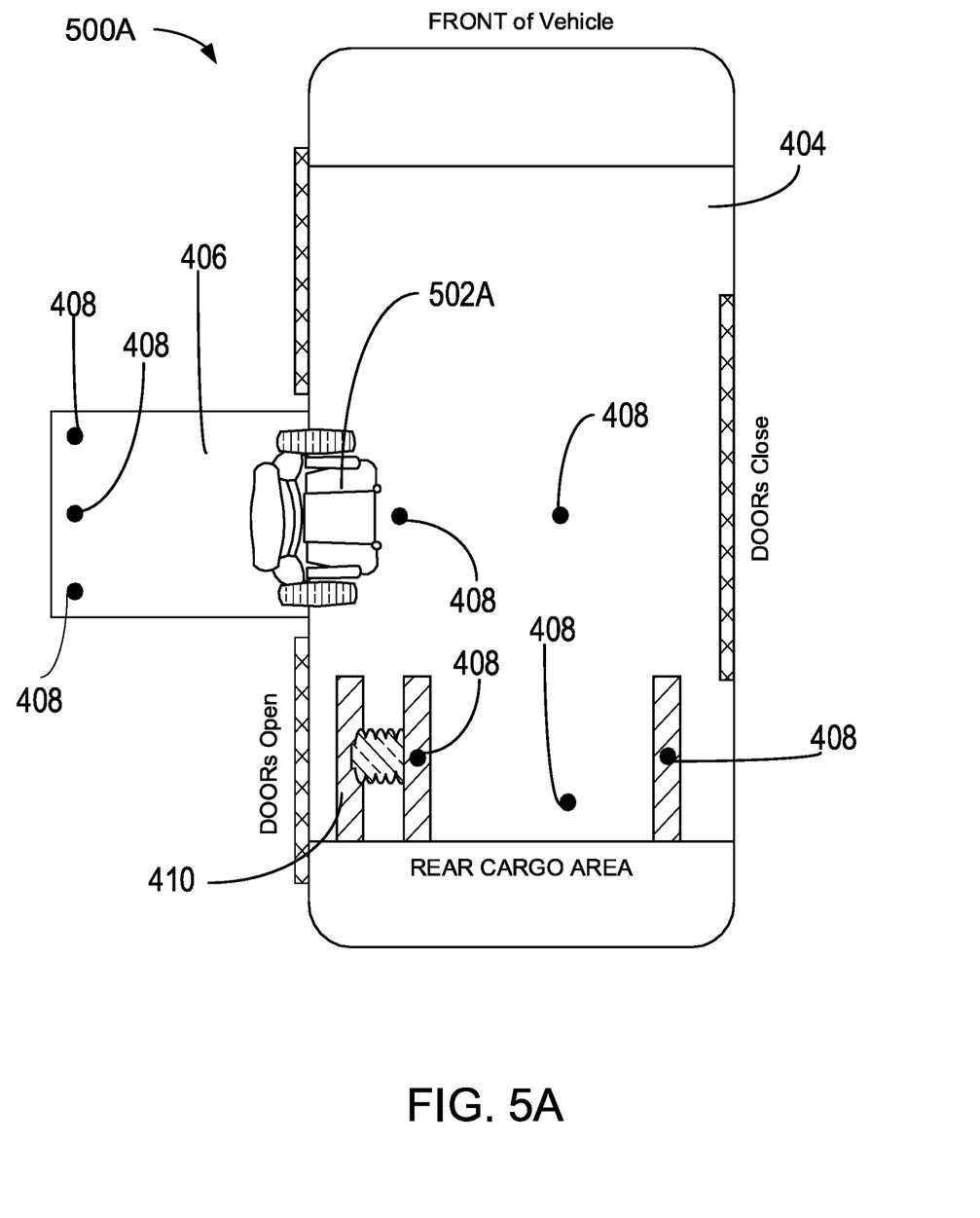
FIGS. 5A and 5B illustrate an example of the continued wheelchair ingress into an AV, according to some aspects of the disclosed technology.
Figure 5B:
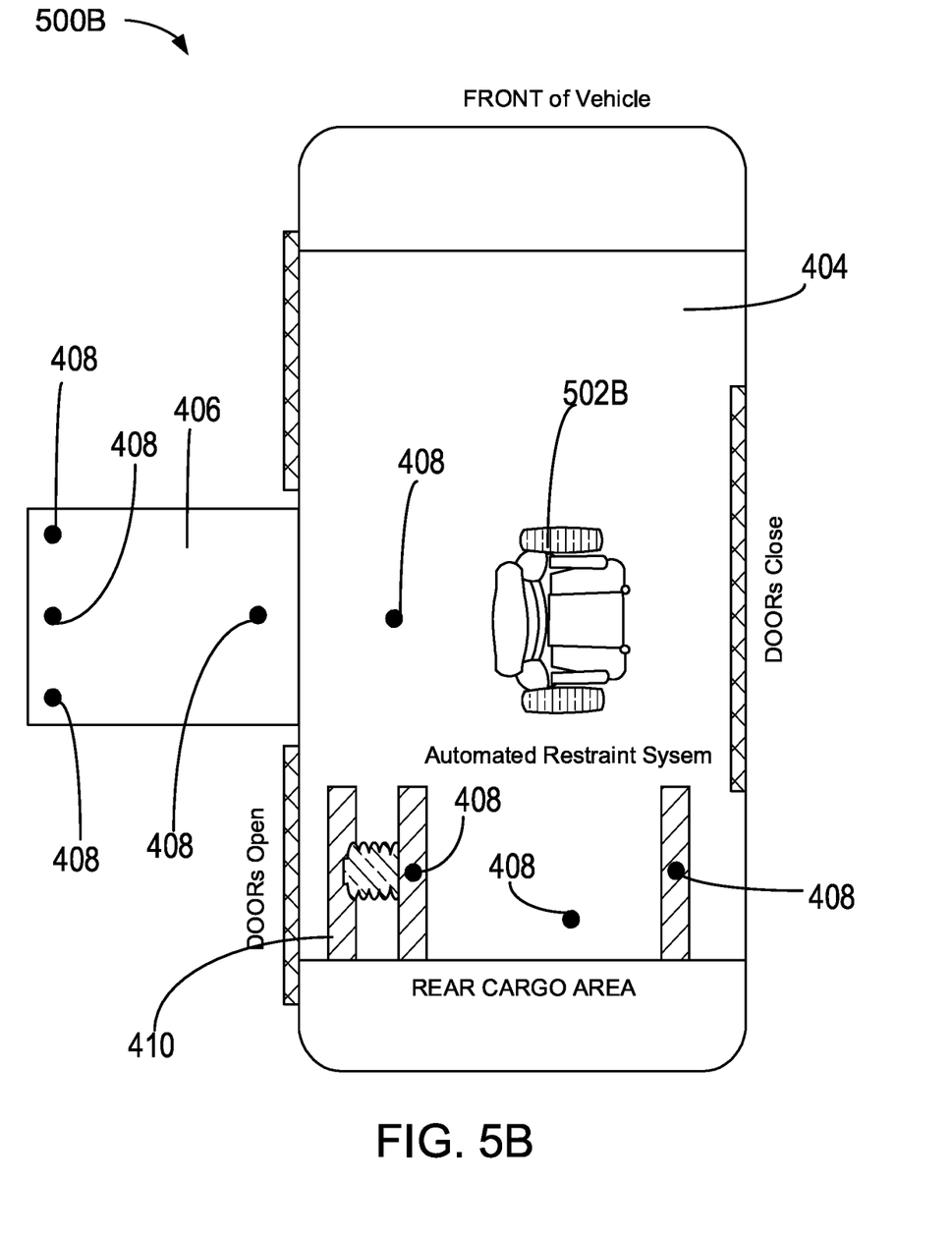

FIGS. 5A and 5B illustrate example of the continued wheelchair ingress into an AV 500, according to some aspects of the disclosed technology. In the example of FIG. 5A, wheelchair 502A is shown entering through open doors on one side of AV 500A. As discussed above, the position and/or orientation of wheelchair 502A can be determined (e.g., by a perception system) based on the occlusion of one or more of visual (reflective) markers 408. In FIG. 5B, wheelchair 502B is shown as entirely enclosed within a cabin of AV 500B, for example, before being secured by an automatic restraint system 410.

Figure 6A:
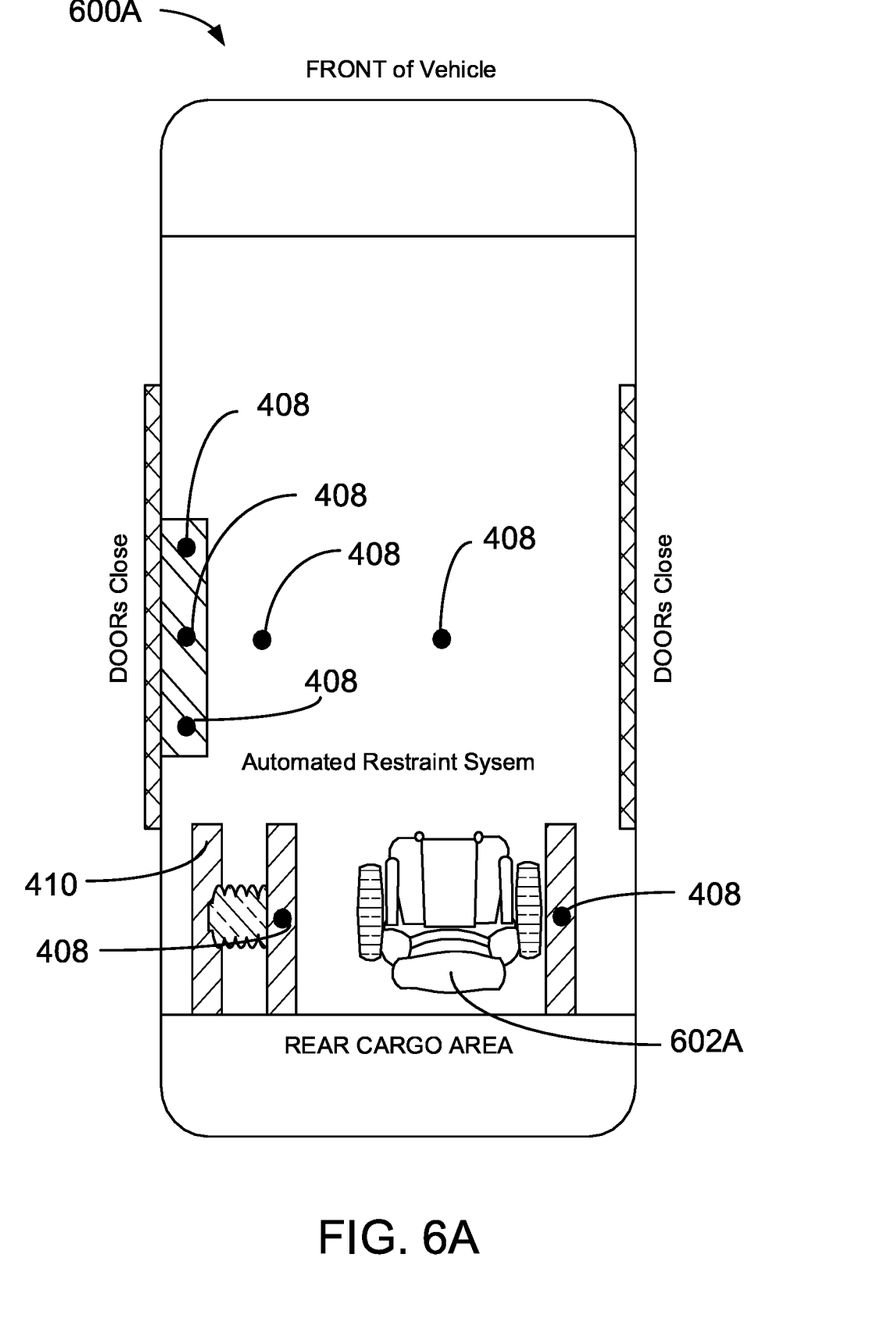
FIGS. 6A and 6B illustrate examples of how a wheelchair can be secured using an automatic restraint system, according to some aspects of the disclosed technology.
Figure 6B:
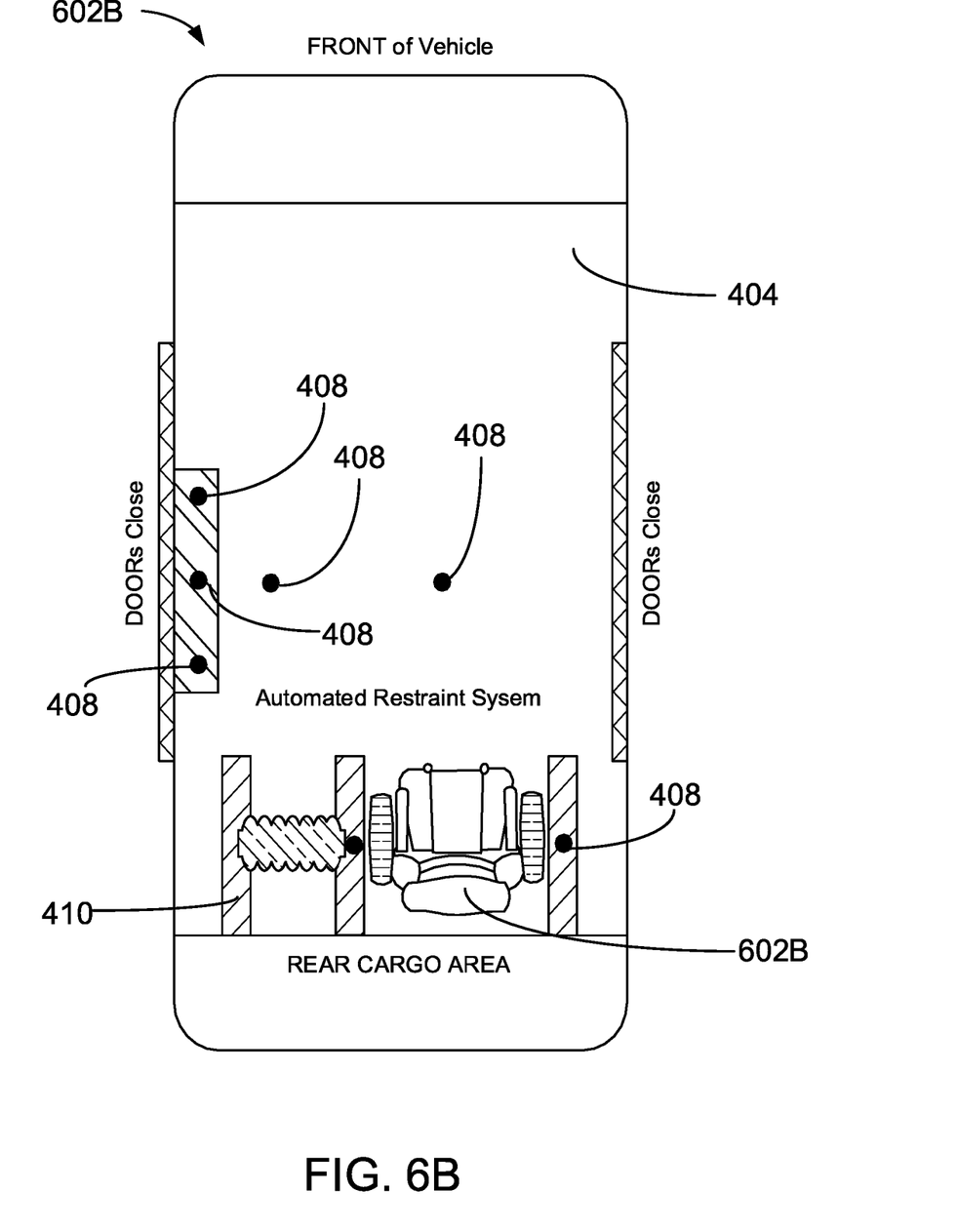

FIGS. 6A and 6B illustrate examples of how wheelchair (602A, 602B, respectively) can be automatically secured using restraint system 410, according to some aspects of the disclosed technology. In these examples, wheelchair ramp 406 has been retracted into AV 404. Retraction and deployment of ramp 406 can be performed automatically, based on the progress of the wheelchair loading and unloading, as determined by the AV's perception system. In the example of FIG. 6A, wheelchair 602A is positioned adjacent to an automatic restraint system 410. In FIG. 6B, automatic restraint system is shown in a secure position, i.e., making contact with wheelchair 602B, so that the wheelchair does not shift as AV 404 is operated. It is understood that various types of automatic restraint systems are contemplated, without departing from the scope of the disclosed technology.

In some aspects, the AV can be configured to send control signals to the wheelchair, for example, to affect wheelchair positioning in a manner that facilitates operations of automatic restraint system 410. For example, using the perception system (see FIG. 2), the AV can provide control signals to the wheelchair (or other assistance device), to finely adjust the wheelchair's position for faster and more effective restraint within the AV cabin. In a similar manner, control signals may be used to facilitate the unloading of the wheelchair, i.e., by adjusting a position of the wheelchair (forward, backward or side-to-side), to assist the user/rider in unloading the wheelchair from the AV cabin.

Figure 7:
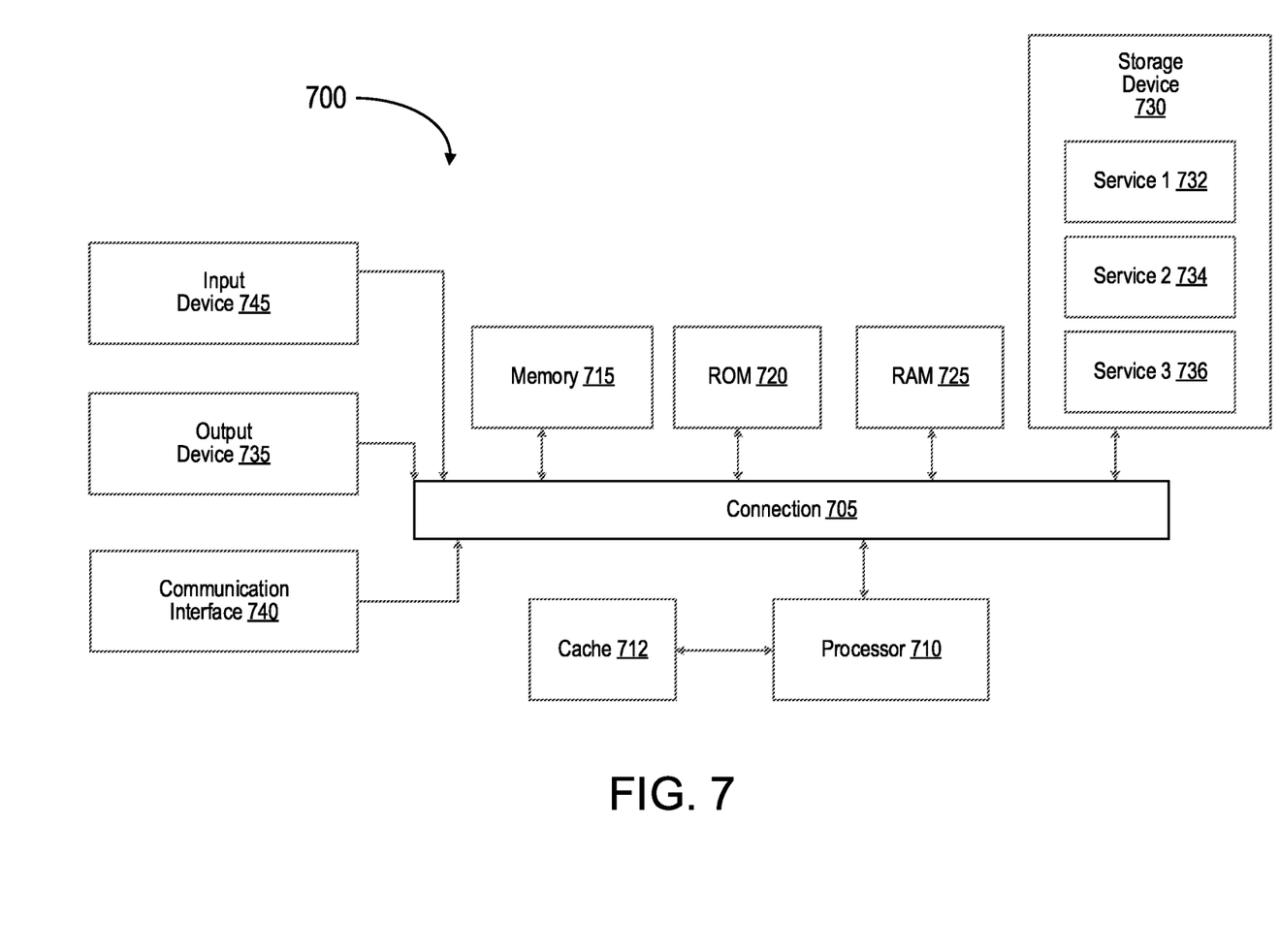
FIG. 7 illustrates an example processor-based system with which some aspects of the subject technology can be implemented.

FIG. 7 illustrates an example processor-based system with which some aspects of the subject technology can be implemented. For example, processor-based system 700 that can be any computing device making up internal computing system 110, remote computing system 150 and/or a passenger device executing the rideshare app 170, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a BLU-RAY DISC® (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re- RAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

FIG. 7 illustrates an example processor-based system with which some aspects of the subject technology can be implemented. Specifically, FIG. 7 illustrates system architecture 700 wherein the components of the system are in electrical communication with each other using a bus 705. System architecture 700 can include a processing unit (CPU or processor) 710, as well as a cache 712, that are variously coupled to system bus 705. Bus 705 couples various system components including system memory 715, (e.g., read only memory (ROM) 720 and random access memory (RAM) 725, to processor 710.

System architecture 700 can include a cache of high-speed memory connected directly with, in close proximity to, or integrated as part of the processor 710. System architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. Memory 715 can include multiple different types of memory with different performance characteristics. Processor 710 can include any general purpose processor and a hardware module or software module, such as module 1 (732), module 2 (734), and module 3 (736) stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the computing system architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms. In some instances, multimodal systems can enable a user to provide multiple types of input to communicate with the computing system architecture 700. Communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 can include software modules 732, 734, 736 for controlling processor 710. Other hardware or software modules are contemplated. Storage device 730 can be connected to the system bus 705. In one aspect, a hardware module that performs a particular function can include the software component stored in a computer-readable medium in connection with the necessary hardware components, such as the processor 710, bus 705, output device 735, and so forth, to carry out various functions of the disclosed technology.

By way of example, instruction stored on computer-readable media can be configured to cause one or more processors to perform operations including: receiving, at an AV computing system, a first dispatch request, wherein the first dispatch request is associated with a first user identifier (ID), receiving, at the AV computing system, a first recognition model, wherein the first recognition model corresponds with the first user ID, receiving, at the AV computing system, an image stream comprising one or more images of pedestrian faces, and providing the one or more images to the first recognition model. In some aspects, the instructions can further cause processors 710 to perform operations for: determining, using the first recognition model, if a first user represented in the one or more images corresponds with the first user ID, unlocking a door of the AV in response to a match between at least one of the one or more images and the first user ID, and/or updating the first recognition model in response to a match between at least one of the one or more images and the first user ID.

In some aspects, memory stored operations/instructions can be configured to further cause processors 710 to perform operations for: receiving a second recognition model corresponding with a second user ID, providing the one or more images to the second recognition model, and determining, using the second recognition model, if a second user represented by the one or more images corresponds with the second user ID. In some approaches, the operations may further cause the processors to perform operations for unlocking a door of the AV in response to a match between at least one of the one or more images and the second user ID.

Depending on the desired implementation, the first recognition model can be a machine-learning model that has been trained using a plurality of facial images of the first user, and wherein the second recognition model is a machine-learning model that has been trained using a plurality of facial images of the second user.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed:

1. A computer-implemented method comprising:
   identifying one or more reference features on at least one surface of an autonomous vehicle (AV);
   automatically deploying a ramp to facilitate ingress of a wheelchair, wherein the ramp comprises visual markers;
   determining a position of the wheelchair based on a position of the visual markers;
   engaging a wheelchair restraint system during ingress of the wheelchair; and
   tracking the ingress of the wheelchair based on the one or more reference features.

2. The computer-implemented method of claim 1, wherein the one or more reference features are a plurality of reference features.

3. The computer-implemented method of claim 1, wherein the at least one surface of the autonomous vehicle includes an interior of a cabin of the autonomous vehicle and the ramp of the autonomous vehicle.

4. The computer-implemented method of claim 1, wherein engaging the wheelchair restraint system is responsive to a command.

5. The computer-implemented method of claim 1, wherein the wheelchair restraint system is configured to receive commands from a ridesharing application.

6. The computer-implemented method of claim 1, wherein tracking the ingress of the wheelchair includes tracking using sensors of the autonomous vehicle.

7. The computer-implemented method of claim 1, wherein the one or more reference features are used to ascertain a location of the wheelchair.

8. A system comprising:
   a storage configured to store instructions;
   a processor configured to execute the instructions and cause the processor to:
      identify one or more reference features on at least one surface of an autonomous vehicle (AV);
      automatically deploy a ramp to facilitate ingress of a wheelchair, wherein the ramp comprises visual markers;
      determine a position of the wheelchair based on a position of the visual markers;
      engage a wheelchair restraint system during ingress of the wheelchair; and
      track the ingress of the wheelchair based on the one or more reference features.

9. The system of claim 8, wherein the one or more reference features are a plurality of reference features.

10. The system of claim 8, wherein the at least one surface of the autonomous vehicle includes an interior of a cabin of the autonomous vehicle and the ramp of the autonomous vehicle.

11. The system of claim 8, wherein engaging the wheelchair restraint system is responsive to a command.

12. The system of claim 8, wherein the wheelchair restraint system is configured to receive commands from a ridesharing application.

13. The system of claim 8, wherein tracking the ingress of the wheelchair includes tracking using sensors of the autonomous vehicle.

14. The system of claim 8, wherein the one or more reference features are used to ascertain a location of the wheelchair.

15. A non-transitory computer readable medium comprising instructions, the instructions, when executed by a computing system, cause the computing system to:
- identify one or more reference features on at least one surface of an autonomous vehicle (AV);
- automatically deploy a ramp to facilitate ingress of a wheelchair, wherein the ramp comprises visual markers;
- determine a position of the wheelchair based on a position of the visual markers;
- engage a wheelchair restraint system during ingress of the wheelchair; and
- track the ingress of the wheelchair based on the one or more reference features.

16. The computer readable medium of claim 15, the one or more reference features are a plurality of reference features.

17. The computer readable medium of claim 15, the at least one surface of the autonomous vehicle includes an interior of a cabin of the autonomous vehicle and the ramp of the autonomous vehicle.

18. The computer readable medium of claim 15, engaging the wheelchair restraint system is responsive to a command.

19. The computer readable medium of claim 15, the wheelchair restraint system is configured to receive commands from a ridesharing application.

20. The computer readable medium of claim 15, tracking the ingress of the wheelchair includes tracking using sensors of the autonomous vehicle.

* * * * *